United States Patent Office 2,988,118
Patented June 13, 1961

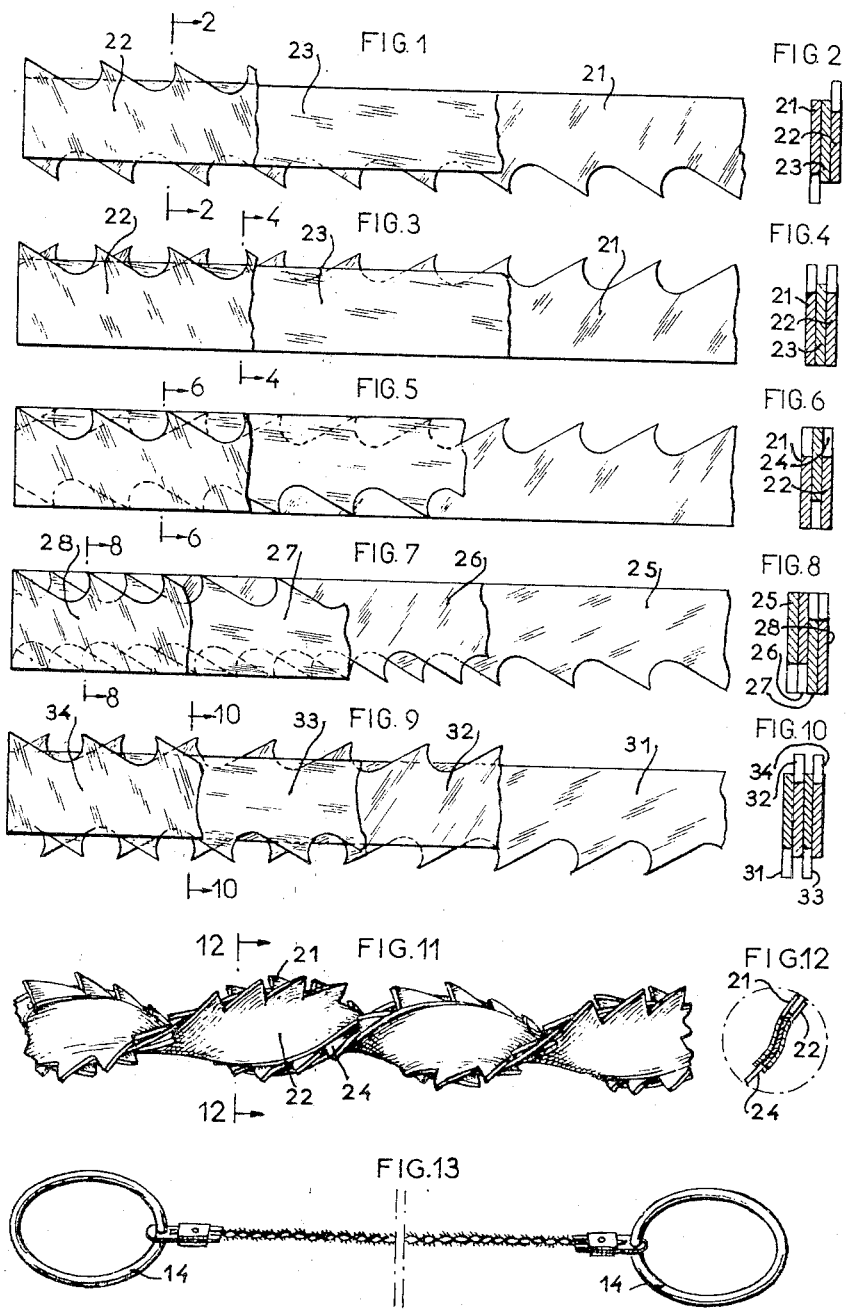

2,988,118
FLEXIBLE SPIRAL TWISTED SAW
Raymond de la Tramerye, Paris, France, assignor to Societe Anonyme Tubest, Paris, France, a company of France
Filed Jan. 30, 1958, Ser. No. 712,245
Claims priority, application Great Britain Feb. 8, 1957
2 Claims. (Cl. 143—133)

In my prior Patent 2,749,949, dated June 12, 1956, I have described a flexible pocket saw comprising two thin narrow steel strips, each toothed along one edge, and substantially of the same length, thickness, and width, said strips being twisted together with the untoothed edge of one strip lying against the toothed edge of the oher strip in such a manner that the untoothed edge of one strip leaves exposed the points of the teeth of the other strip to laterally support only the root portions thereof, whereby, after twisting, the teeth are distributed over the circumference and substantially the entire length of the saw.

One object of the present invention is to provide a pocket saw of the type above mentioned, having a longer life, a stronger structure and more cutting power.

According to my present invention, the saw is constituted by a number of strips superior to two, namely three or more strips.

According to another feature of my invention, the saw is constituted by three strips laid flat against one another, and thereafter twisted together, at least both outer strips having inclined saw-teeth on their edges.

According to still another feature of the invention, the teeth of the different toothed edges of the strips, are directed in different directions.

The invention is illustrated by way of example in the accompanying drawings wherein:

FIG. 1 shows, on a magnified scale, with portions cut away, the shape and arrangement of three blades used for constituting a saw according to the invention, FIG. 2 is a cross-section made on line 2—2 of FIG. 1, FIGS. 3 and 5 are modifications of FIG. 1, FIGS. 4 and 6 are sections made on lines 4—4 and 6—6 of FIGS. 3 and 5 respectively.

FIG. 7 shows another arrangement including four blades,

FIG. 8 is a section made on line 8—8 of FIG. 7.

FIG. 9 is a modification of FIG. 7,

FIG. 10 is a section made on line 10—10 of FIG. 9,

FIG. 11 is a perspective view, also on a magnified scale, showing a portion of a saw according to FIGS. 5 and 6 in its final twisted state.

FIG. 12 is a section made on line 12—12 of FIG. 11, and

FIG. 13 shows, substantially in actual size the saw of FIGS. 11 and 12 with its holding rings.

A saw structure constituted by three steel strips will first be examined, with reference to FIGS. 1 and 2. Before being twisted, two outer strips 21, 22 lie flat against the faces of an intermediate strip 23. The outer strips are each provided on one edge thereof with inclined saw-teeth while both edges of the intermediate strip are smooth. Furthermore, the width of the intermediate strip is somewhat smaller than the overall width of the outer strips in order to let the saw-teeth of said outer strips stand out of the smooth edges of the intermediate strip after the assembly has been twisted into a tool having cutting properties. The width of the intermediate strip, however, is large enough to provide suitable backing effect upon the roots of the adjacent teeth.

In the embodiment illustrated in these figures the teeth of the outer strips are arranged on opposite edges of the assembly, but it is possible, of course, to position the strips with the teeth of one outer strip on one side of the assembly and the teeth of the other outer strip on the other side of the assembly, as illustrated in FIGS. 3 and 4 in which same reference numerals have been used.

Furthermore, it will be noted that, in both embodiments of FIGS. 1 to 4, the teeth of one outer strip are inclined in one direction while the teeth of the other outer strip are inclined in the opposite direction, so as to enable the saw cutting in both directions, but it is obvious that all the teeth may be inclined in the same direction, as a modification, if it is not desired to have the saw cut in both directions.

FIGS. 5 and 6 show a modification in which the middle strip 24 also has one edge provided with inclined saw-teeth. In this embodiment all three strips are equally wide, and the teeth of the middle strip are located on one side of the assembly while the teeth of both outer strips are located on the other side of the assembly, as considered before the structure is twisted, of course. Also, the inclination of the teeth of one of the strips is oppositely directed with respect to the inclination of the teeth of the other two strips.

In the embodiments of FIGS. 7 to 10, the saw is constituted by an assemblage of four strips of equal width and each having teeth on one edge thereof. In the particular embodiment of FIGS. 7 and 8, the teeth on one side of the assembly belong to two adjacent strips, for instance 25, 26, while the teeth on the other side of the assembly belong to the other two strips 27, 28. The arrangement is different in the embodiment of FIGS. 9 and 10, in which the teeth on one side of the assembly belong to two alternate strips 31, 33 or 32, 34. Furthermore, all the teeth on either side of the assembly of FIG. 7 are inclined in the same direction on each side (however, in opposite directions on one side with respect to the other) whereas, in FIG. 9, the teeth are inclined in both directions on each side of the assembly.

By way of example, FIGS. 11 and 12, illustrate, also on a large scale, the aspect of a portion of the saw obtained by twisting a structure similar to that of FIGS. 5 and 6, the general appearance of the tool being illustrated in FIG. 13 with the holding rings 14.

Of course, many different combinations could be made in the scope of the invention without departing from the claims thereof. Thus, the number of the strips used for manufacturing saws of the type involved, the proportion of toothed and smooth strip edges and their distribution in the structure, and the direction of the inclination of the strips' teeth, may be varied as desired.

What is claimed is:

1. A flexible pocket saw comprising three thin, narrow, flat steel strips of greater width than thickness twisted together to constitute a cutting wire, the inner one of said three strips having at least one untoothed edge and at least the two outer strips being of equal width and provided with teeth along one of their edges, and said three strips being laid flat against one another prior to being twisted together with the toothed edges of said outer strips lying against said untoothed edge of said inner strip.

2. A flexible pocket saw as claimed in claim 1, in which the teeth of said outer strips are directed in opposite cutting directions.

References Cited in the file of this patent

UNITED STATES PATENTS

| 626,621 | L'Hoir et al. | June 6, 1899 |
| 1,954,905 | Wheat | Apr. 17, 1934 |
| 2,749,949 | De la Tramerye | June 12, 1956 |
| 2,774,400 | Frickhofen | Dec. 18, 1956 |